(12) United States Patent
Simons (10) Patent No.: US 8,925,496 B2
(45) Date of Patent: Jan. 6, 2015

(54) SYSTEM AND METHOD FOR RESTRAINING AN ANIMAL

(71) Applicant: The Pet Salon, Inc., Margate, NJ (US)

(72) Inventor: Charles Ross Simons, Margate, NJ (US)

(73) Assignee: The Pet Salon, Inc.

( * ) Notice: Subject to any disclaimer, the term of this patent is extended or adjusted under 35 U.S.C. 154(b) by 151 days.

(21) Appl. No.: 13/758,998

(22) Filed: Feb. 4, 2013

(65) Prior Publication Data

US 2013/0139763 A1  Jun. 6, 2013

Related U.S. Application Data

(60) Continuation-in-part of application No. 13/113,232, filed on May 23, 2011, now Pat. No. 8,365,685, which is a division of application No. 12/277,481, filed on Nov. 25, 2008, now abandoned, which is a continuation of application No. 10/342,359, filed on Jan. 14, 2003, now abandoned, which is a continuation-in-part of application No. 10/271,825, filed on Oct. 15, 2002, now abandoned.

(60) Provisional application No. 60/370,045, filed on Apr. 3, 2002.

(51) Int. Cl.
*A01K 27/00* (2006.01)
*A01K 15/04* (2006.01)
*A01K 1/06* (2006.01)
*A01K 13/00* (2006.01)
*A01K 1/04* (2006.01)

(52) U.S. Cl.
CPC . *A01K 1/04* (2013.01); *A01K 15/04* (2013.01); *A01K 1/0613* (2013.01); *A01K 13/001* (2013.01); *A01K 1/06* (2013.01)
USPC ............................................ 119/856; 119/756

(58) Field of Classification Search
USPC .......... 119/856, 753, 755–757, 863, 795, 797
See application file for complete search history.

(56) References Cited

U.S. PATENT DOCUMENTS

| 255,574 | A | | 3/1882 | Bonelli |
| 1,316,163 | A | | 9/1919 | Kennedy |
| 1,405,632 | A | | 2/1922 | Sladky |
| 2,132,556 | A | | 10/1938 | Blackshaw |
| 2,438,979 | A | | 4/1948 | Short |
| 2,902,976 | A | | 9/1959 | Wilson |
| 2,909,154 | A | | 10/1959 | Thomas |
| 3,120,836 | A | | 2/1964 | Brauning |
| 3,208,432 | A | | 9/1965 | Fisk |
| 3,266,464 | A | * | 8/1966 | Davis ............................ 119/756 |

(Continued)

*Primary Examiner* — Kristen C Hayes
(74) *Attorney, Agent, or Firm* — The Belles Group, P.C.

(57) ABSTRACT

A restraint for an animal having a strap forming first and second connection loops and including first and second strap portions, having approximately equal lengths, connected between the connection loops to form a restraining loop. A first connector is affixed at the first connection loop, and a second connector is affixed at the second connection loop. A quick-release connector is disposed in line with and more proximate to one of the first or second strap portions to open the restraining loop. A clamp is slidably disposed over the first and second strap portions. The clamp divides the restraining loop into a primary loop and a secondary loop and maintains the size of the primary loop around the animal's neck, with the quick-release connector positioned to open the primary loop.

19 Claims, 6 Drawing Sheets

(56) References Cited

U.S. PATENT DOCUMENTS

| | | |
|---|---|---|
| 3,458,188 A | 7/1969 | Infante |
| 4,261,296 A | 4/1981 | Rosenberg |
| RE32,052 E | 12/1985 | Rosenberg et al. |
| 4,570,577 A | 2/1986 | Bellinger |
| 4,828,210 A * | 5/1989 | Anderson et al. ........ 248/229.15 |
| 5,005,527 A | 4/1991 | Hatfield |
| 5,167,203 A | 12/1992 | Scott et al. |
| 5,269,260 A | 12/1993 | Farrell et al. |
| 5,433,288 A | 7/1995 | James |
| 5,666,909 A | 9/1997 | Dupre |
| 5,732,660 A | 3/1998 | David et al. |
| 5,749,325 A | 5/1998 | Albanese |
| 5,806,467 A * | 9/1998 | Arakawa ....................... 119/771 |
| 6,192,835 B1 | 2/2001 | Calhoun et al. |
| 6,244,611 B1 | 6/2001 | Davis |
| 6,382,139 B1 | 5/2002 | Rhodes |
| 6,490,999 B1 | 12/2002 | Boys |
| 6,516,753 B1 | 2/2003 | Taylor |
| 6,675,742 B1 | 1/2004 | Shiraki |
| 7,243,825 B2 | 7/2007 | Weisenfeld |
| 8,267,050 B1 * | 9/2012 | Hatcher et al. ................ 119/797 |
| 8,365,685 B2 * | 2/2013 | Simons ......................... 119/856 |
| 8,505,495 B2 * | 8/2013 | Wang ............................ 119/797 |

* cited by examiner

SYSTEM AND METHOD FOR RESTRAINING AN ANIMAL

PRIORITY

Priority is claimed as a continuation-in-part application to U.S. patent application Ser. No. 13/113,232, filed May 23, 2011, which is a divisional application of U.S. patent application Ser. No. 12/277,481, filed Nov. 25, 2008, which is a continuation application of U.S. patent application Ser. No. 10/342,359, filed Jan. 14, 2003, which is a continuation-in-part of U.S. patent application Ser. No. 10/271,825, filed Oct. 15, 2002, which claims priority to provisional application No. 60/370,045, filed Apr. 3, 2002. The disclosure of the aforementioned priority documents are incorporated herein by reference in their entirety.

BACKGROUND OF THE INVENTION

1. Field of the Invention

The field of the present invention is systems and methods for restraining animals, particularly restraint systems and methods that may be used by pet groomers and other pet or animal handlers.

2. Background

Grooming loops have long been used by groomers to position and/or restrain animal animals, particularly dogs and cats, on a grooming table or platform while the animal is being groomed. The loop is typically connected to an eye-bolt hanging from the upper end of an L-shaped grooming arm, often by a swivel snap closure mechanism that engages the eye-bolt. The loop is placed over the animal's head to rest around its neck. With the animal's movement limited or restricted by the loop, the groomer then cuts and combs fur, removes fur from the paws, mouth, nose and eye areas, other parts of the anatomy, pares toenails, sprays and does all the procedures for proper grooming of the particular breed being groomed. Similarly, loops and other restrain mechanisms have been used by animal handlers other than groomers, such as veterinarians who restrain animals during examination and minor surgery.

However, grooming and examination loops and other restraint mechanisms have had a number of disadvantages. The animal undergoing grooming or examination can move in a substantially sized circle creating a greater area in which it could bite the handler, turn around and chew through the loop or restraint, and even fall off the platform on which the animal is placed, leaving it hanging with the loop or other restraint tightly around its neck. Moreover, since the animal is actually hanging in the loop or other restraint, even while the animal is on the platform, the loop can press uncomfortably around its throat. The animal's ability to struggle causes discomfort to it and its ability to move can make a handler's job difficult or even dangerous as the animal can fall or bite, unless muzzled.

In U.S. Pat. No. 4,828,210 to Anderson et al. an adjustable lock device suitable for being clamped at one end to the vertical portion of a grooming arm is described. It is stated that the device can be attached by a snap closure mechanism at its opposite end to a training aid combination collar and muzzle, which is sold under the trademark GENTLE LEADER®. This commercially available collar and muzzle has an O-ring stitched inside its end portion. Attempts have been made to use the combination of the adjustable lock device attached to the collar and muzzle at the O-ring for grooming.

However, this combination of parts does not work well since the animal is not attached to the top of the L-portion of the grooming arm and can still have a substantial area for movement. Moreover, the limitations imposed by attachment to the vertical portion of the grooming arm and the muzzle tend to make the animal less accessible during grooming. In addition, when the animal is muzzled its mouth area and some parts of the face cannot be groomed.

Moreover, at certain times, adjustments may need to be made to the system to accommodate various sizes of animals. However, current systems do not provide the ability to easily and quickly adjust the system to fit a wide range of sizes of animals.

Therefore, a need exists to provide restraints, systems, and methods which provide a comfortable fit for the animal, a fully adjustable system to define the range of movement an animal, and a fully adjustable system to accommodate all range of sizes of animals.

SUMMARY OF THE INVENTION

The present invention is directed toward systems and methods for restraining an animal, all enabling the handling of a wide size range of animals with reconfiguration simplicity. In the systems and methods described, the restraint can be quickly and efficiently fitted to an animal regardless of size, the animal can be secured comfortably, without causing the discomfort of potential choking in the animal, and the animal can be quickly released by the handler.

A restraint for an animal is incorporated into the system and method, and the restraint includes a strap forming first and second connection loops and including first and second strap portions connected between the connection loops to form a restraining loop, wherein the first and second strap portions have substantially equal lengths. A first connector is affixed at the first connection loop, and a second connector is affixed at the second connection loop. A quick-release connector is disposed in line with one of the first or second strap portions, more proximate to one of the first and second connection loops than to the other, and it is adapted to open the restraining loop. A clamp is slidably disposed over the first and second strap portions, and it is adapted to divide the restraining loop into a primary loop and a secondary loop and to maintain a size of the primary loop around the animal's neck, with the quick-release connector being positioned to open the primary loop.

The system incorporates the restraint by including two restraining arms to which to cross-tie the animal using the restraint. The first and second securing arms may be integrated in an L-shaped configuration Advantages of the restraint, system, and method will be apparent from the following description.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
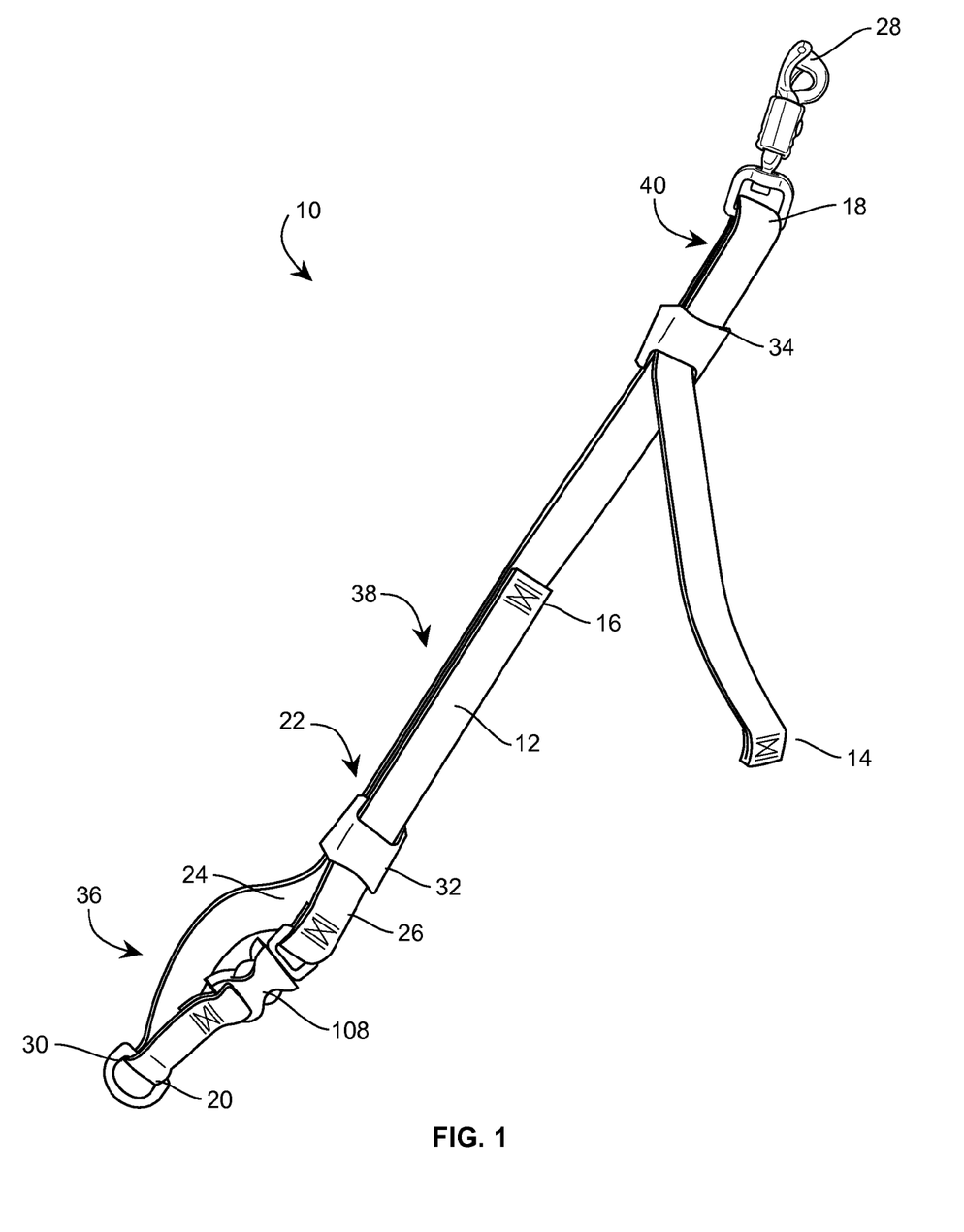
FIG. 1 illustrates a perspective view of a restraint for restraining an animal.

Referring now to FIG. 1, a restraint 10 includes a folded strap 12 having a first end 14, a second end 16, a first fold 18, and a second fold 20. The first fold 18 and the second fold 20 are disposed between the first and second ends 14, 16. The second end 16 is affixed to the strap between the first fold 18 and the second fold 20, which forms a first loop 22 having first and second sides 24, 26 of substantially equal lengths. The second end 16 may be affixed to the strap 12 with stitching, for example. The strap 12 may made of material such as Nylon webbing, Polyester webbing cotton webbing, cloth, or other similar materials, for example.

The restraint further includes a first connector 28 slidably disposed at the first fold 18, and a second connector 30 affixed at the second fold 20 by, for example, stitching the opposing sides of the strap about the second fold 20 so that the second connector 30 can not slide along the strap 12. The first and/or second connector 28, 30 may optionally be fixed or slideably disposed in relation to the strap 12. As illustrated in FIG. 1, the first connector 28 is a panic snap closure mechanism (which are well-known in that art of animal restraints, with the swivel and load bearing structure being separated from the latching mechanism) and the second connector 30 is a D-ring. However, the first and/or second connector 28, 30 may also be any of a swivel snap closure mechanism, a D-ring, a grommeted hole, or any other structure that allows a connection to be made. A connector with a swivel feature facilities use of the restraint 12 by either a right-handed or left-handed groomer. Moreover, due to the swivel movement, the animal cannot twist the strap, thereby avoiding the strap tightening around its neck. The grommeted hole may be circular, square, triangular, D-shaped or of other convenient geometric shape and the grommet is shaped to the hole and protects it by engaging the front and rear sides of the strap around the perimeter of the hole.

The restraint further includes a first clamp 32 and a second clamp 34. The first clamp 32 is slideably disposed over the first and second sides 24, 26 of the first loop 22. Thus, the first clamp 32 divides the first loop 22 into two loops, a primary loop 36 and a secondary loop 38. The primary loop 36 is adapted to receive the neck of an animal. As the first clamp 32 is slideably disposed over the first and second sides 24, 26 of the first loop 22, the size of the primary loop 36 may be adjusted so as to provide the desired size of the primary loop 36 for the particular size of an animal's neck. The second clamp 34 is slideably disposed over the first side and second side of the strap 12 around the first fold 18. Thus, the second clamp 34 forms a second loop 40 and an open side as the first end 14 is not affixed to another part of the strap 12. As the second clamp 34 is slideably disposed over the first and second sides of the strap around the first fold 18, the size of the second loop 40 may be adjusted so as to provide the desired length of the strap 12 between the second end 16 and the first connector 28. The adjustment of the size of the second loop 40 can be used to accommodate various heights of animals when the restraint is used with a system adapted to connect the first connector to an anchor point above the head of the animal, as is discussed in more detail below. As illustrated in FIG. 1, the first and second clamp 32, 34 is a cam snap. However, the first and/or second clamp 32, 34 may be a cam snap or any other structure that allows the size of the primary loop 36 and the second loop 40 respectively to be selectively fixed in place.

Figure 2:
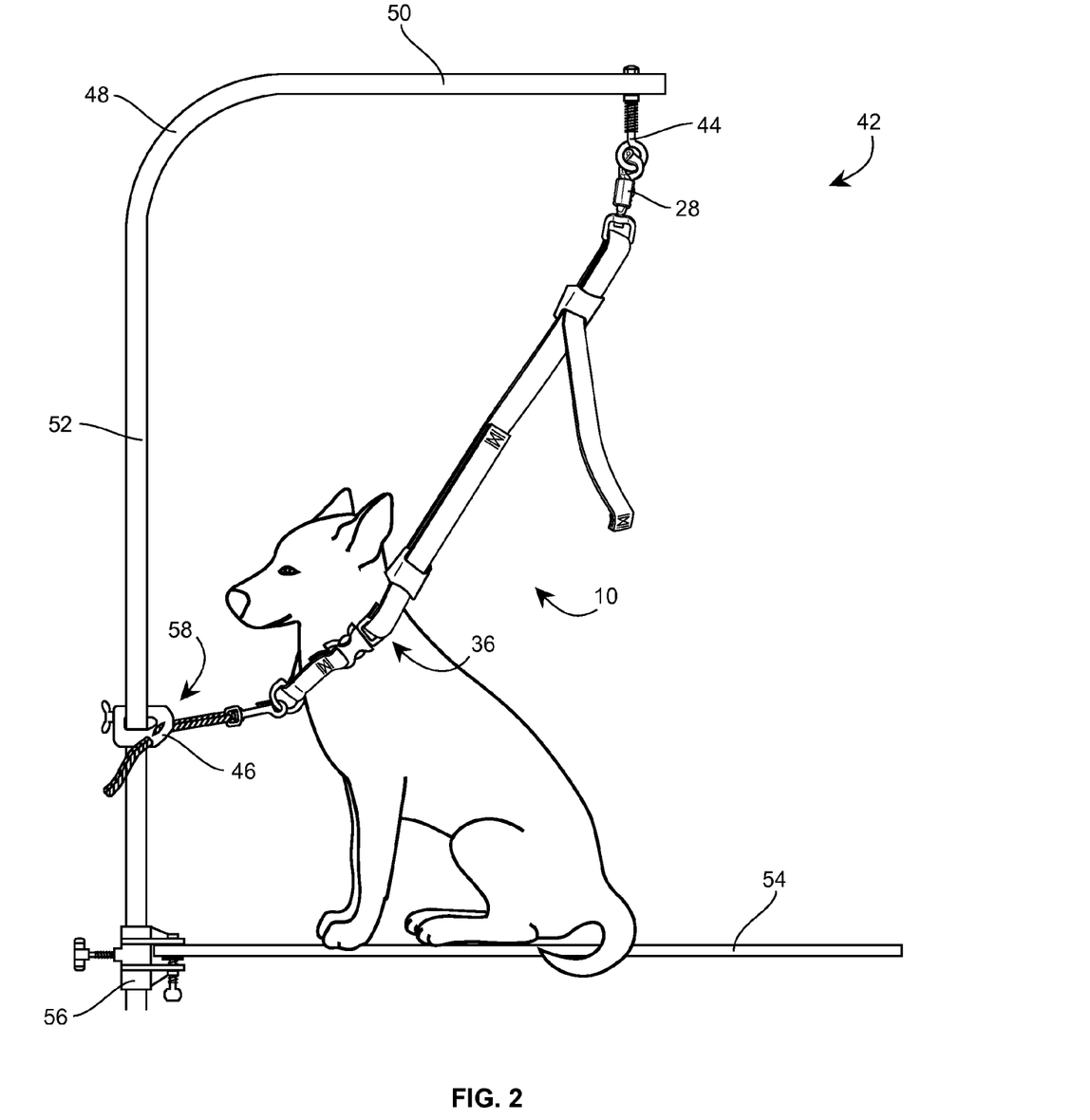
FIG. 2 illustrates a perspective view of a system for restraining an animal.

Referring now to FIG. 2, a system 100 for restraining an animal is shown. The system 42 includes the restraint 10 of FIG. 1 with an animal's neck disposed in the primary loop 36. The first connector 28 is releasably connected to a first anchor point 44 and the second connector 30 is releasably connected to the second anchor point 46. In the system 100 shown, the first connector 28 is disposed above the head of the animal and the second connector 30 is disposed at or below the animal's head. The system 42 includes a securing arm 48 having a horizontal section 50 containing the first anchor point 44 and a vertical section 52 containing the second anchor point 46. The securing arm 48 may be movably connected to the platform 54 so that the distance between the horizontal section 50 of the securing arm 48 and the platform 54 is adjustable. As shown, the securing arm 48 is movably connected to the platform 54 with a clamp 56 which fixes the position of the securing arm 48 around the periphery of the platform 54 and which fixes the relative height of the horizontal section 50 of the securing arm 48 in relation to the platform 54. The clamp 56 may be fixed to the securing arm 48, or alternatively, the clamp 56 may include an aperture that has a cross section complimentary to the cross section of the securing arm 48 and a tensioning mechanism, such as a bolt, which applies pressure against the securing arm 48 so as to fix the vertical height of the securing arm 48 in relation to the platform 54. In such embodiments, the securing arm 48 may be positioned in front of the animal as illustrated, or may be positioned to the side of the animal.

In certain embodiments, there may be a third anchor point which may be disposed on a second securing arm. The second securing arm may be positioned in a different location than the first securing arm and connect from the third anchor point to the second connector of the restraint in addition to the second connector of the restraint being connected to the first anchor point. In this way, an animal may be cross-tied and their range of motion may be further limited. Although the securing arm has been described as being attached to the platform with a clamp, it is to be understood that the securing arm may be connected to the platform by any manner that allows the anchor points and the restraint to securely restrain an animal.

The anchor points may be movable in relation to the securing arm. For example, the height of the first anchor point, relative to the platform, may be adjustable to allow a handler to position the second anchor point so as to be comfortable for the animal and/or to control the area of movement of the animal's head. When the second anchor point is low, i.e. near the platform, it is particularly convenient for the groomer to pare toenails. When the second anchor point is in an intermediate position, i.e. approximately at the height of the animals chest, it is particularly convenient to groom the animal's legs, as the animal is not able to drop its head to attempt to bite the groomer. When the second anchor point is in a high position, i.e. above the intermediate position so that the animal is effectively muzzled by the loop and the handler can then safely groom the animal's beard, face and eyes areas, which parts of the animal's anatomy are otherwise of concern since they are close to the mouth and often require assistance from another person.

The anchor points may be disposed on a different structure or surface than a securing arm. For example, the first anchor point may be disposed on the ceiling. As another example, the second anchor point may be disposed on a wall. Essentially, the anchor point may be disposed on any surface that provides a secure point of attachment for the connectors of the restraint.

As illustrated in FIG. 2, the second connector 30 is connected to the second anchor point 46 with a lock and tether 58, such as described in U.S. Pat. No. 4,828,210 to Anderson et al., the disclosure of which is incorporated herein by reference. The length of the tether 58 between the second anchor point 46 and the second connector 30 may be adjusted to accommodate the size of the particular animal and/or to accommodate a certain desired range of motion.

The restraint and system described above are intended to keep a dog, or other animal, in either a sitting position or in what is commonly referred to as the "stacked" position, or just "stacked" (e.g., standing). In the "stacked" position, the restraint places pressure on the sides and back of the animal's neck, but not on the throat. In either position, without pressure on the throat, the animal is less likely to panic. Moreover, with pressure on the back of the neck, the animal will generally stay in the sitting or stacked position, whichever is desired by the handler.

Figure 3:
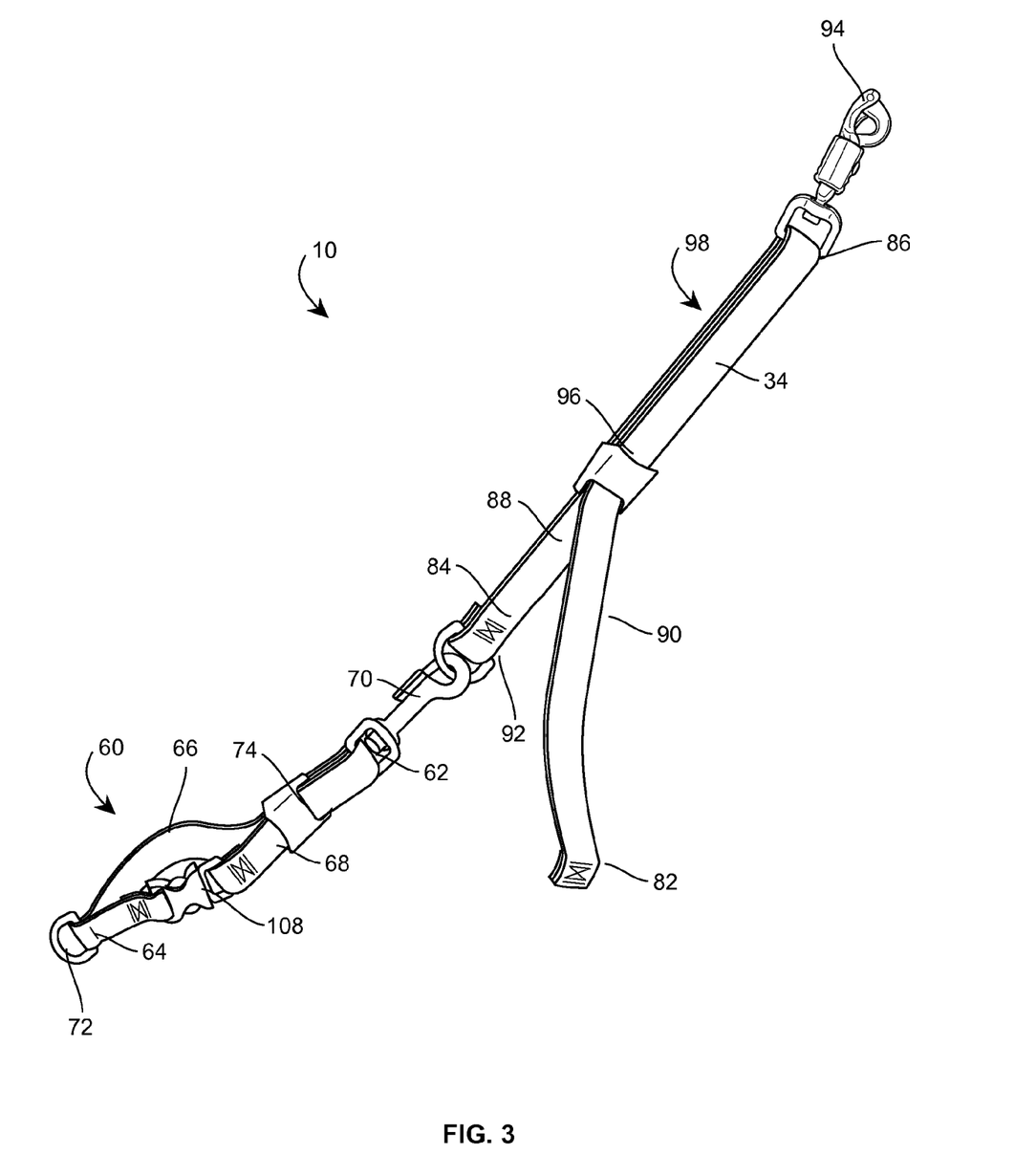
FIG. 3 illustrates a perspective view of another restraint for restraining an animal.

Referring now to FIG. 3, the restraint 10 includes a looped strap 60 forming first and second connection loops 62, 64, with the first and second sides 66, 68 of the looped strap 60 extending therebetween. The first and second sides 66, 68 of the looped strap 60 have substantially equal lengths.

The looped strap 60 further includes a first connector 70 slideably disposed at the first connection loop 62, and a second connector 72 affixed at the second connection loop 64. The second connector 72 may be fixed by, for example, with stitching on the opposing sides of the strap about a fold so that the second connector 72 can not slide along the strap 60. The first and/or second connector 70, 72 may be fixed or slideably disposed in relation to the strap. As illustrated, the first connector 70 is a swivel snap closure and the second connector 72 is a D-ring. However, the first and/or second connector 70, 72 may be any of a snap closure mechanism (swivel, panic, etc.), a D-ring, a grommeted hole, or any other structure that allows a connection to be made, just as described above.

The looped strap 60 further includes a first clamp 74 slideably disposed over the first and second sides 66, 68 of the looped strap. Thus, the first clamp 74 divides the first loop into two loops, a primary loop 76 and a secondary loop 78. The primary loop 76 is the loop that receives the neck of an animal. As the first clamp 74 is slideably disposed over the first and second sides 66, 68 of the primary loop 76, the size of the primary loop 76 may be adjusted so as to provide the desired size of the primary loop 76 for the particular size of an animal's neck.

The restraint further contains a folded strap 80 having a first end 82, a second end 84, a fold 86 between the first end 82 and the second end 84, a first side 88 between the first end 82 and the fold 86, and a second side 90 between the second end 84 and the fold 86. The folded strap 80 includes a third connector 92 affixed to the second end 84 of the folded strap 80 and a fourth connector 94 slideably disposed over the fold 86. The folded strap 80 further includes a second clamp 96 slideably disposed over the first and second side 88, 90 of the folded strap 80 thereby forming a third loop 98 and an open side as the first end 82 of the folded strap 80 is not affixed. As the second clamp 96 is slideably disposed over the first and second sides 88, 90 of the strap around the fold 86, the desired length of the folded strap 80 between the third connector 92 and the fourth connector 96 may be easily and quickly adjusted. Depending upon the type of clamp 96 used, adjusting the desired length of the folded strap may be achieved by pulling on either the first end 82 or the second end 84, so that the strap slides through the fourth connector 94 and through the clamp 96. This adjustment can be used to accommodate various heights of animals when the restraint is used with a system adapted to connect the first connector to an anchor point above the head of the animal, as will be discussed in more detail below.

Figure 5:
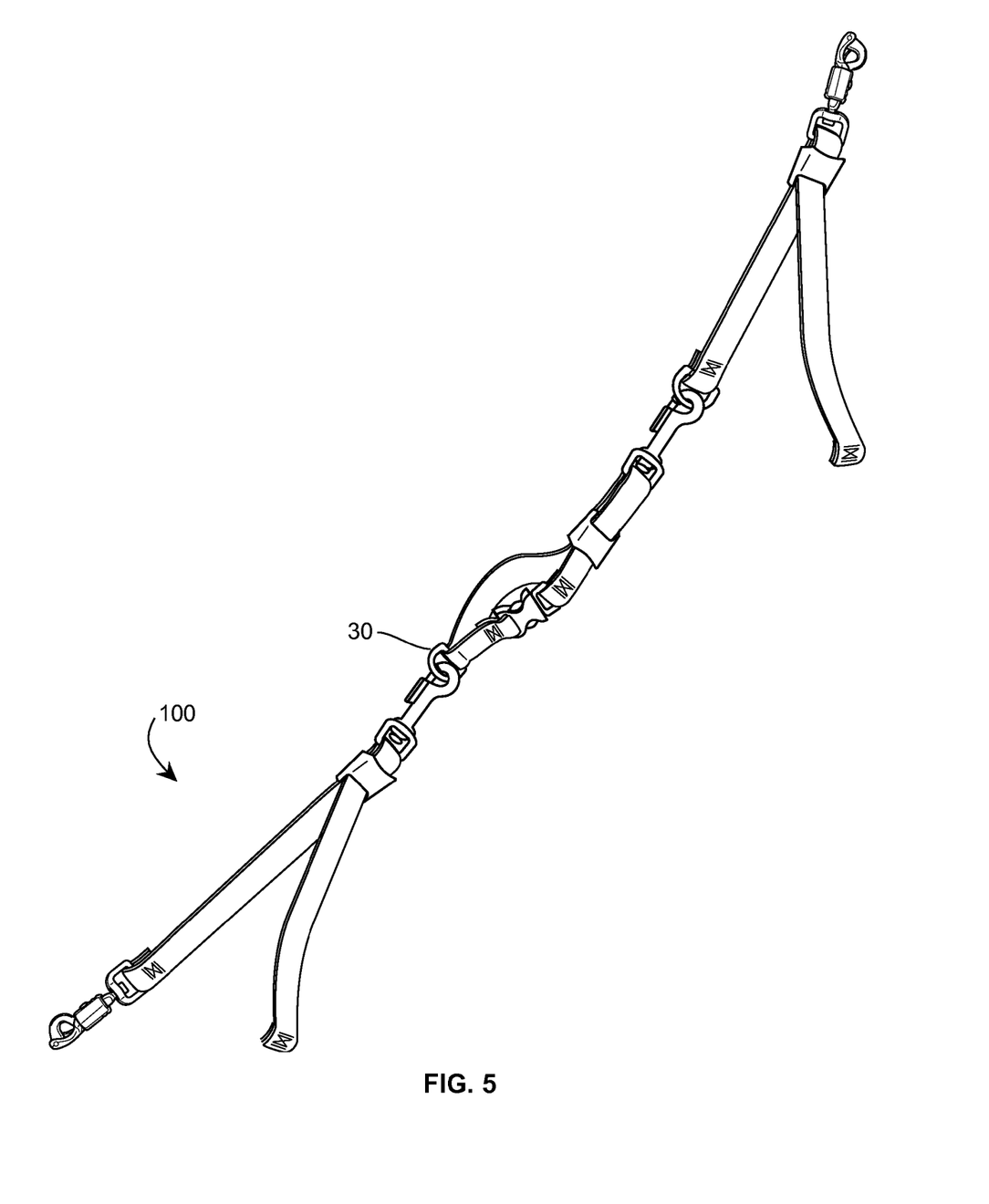
FIG. 5 illustrates a perspective view of a third restraint for restraining an animal.
Figure 6:
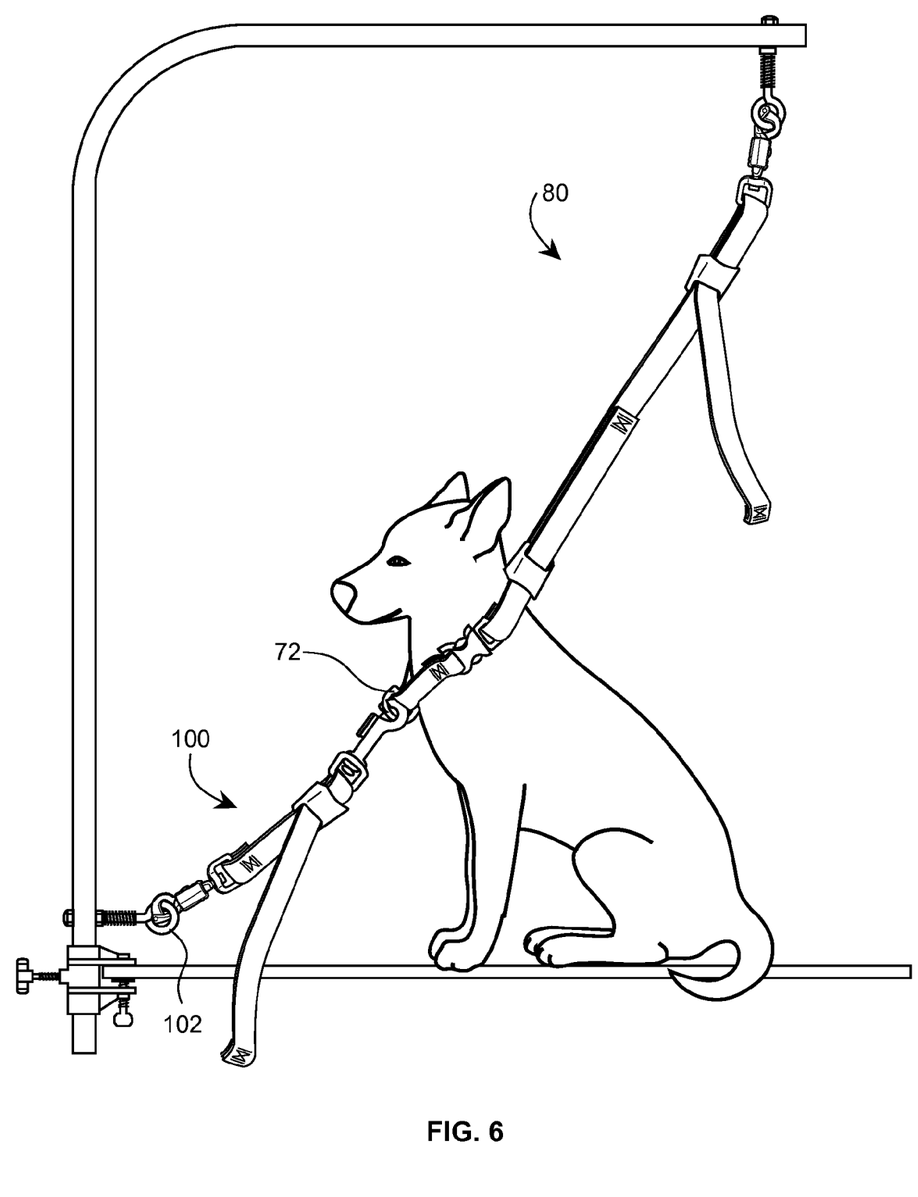
FIG. 6 illustrates a perspective view of a third system for handling animals.

As shown in FIG. 3, the third connector 92 of the folded strap 80 connects to the first connector 70 of the looped strap 60. Alternatively, as illustrated in FIG. 5, the restraint includes a second folded strap 100, similar to the first folded strap 80, except the second folded strap 100 connects with the second connector 72 of the looped strap 60. Similarly, as illustrated in FIG. 6, a second folded strap 100 may be used to connect with the second connector 30 of the folded strap 12 and the second anchor point 46.

Figure 4:
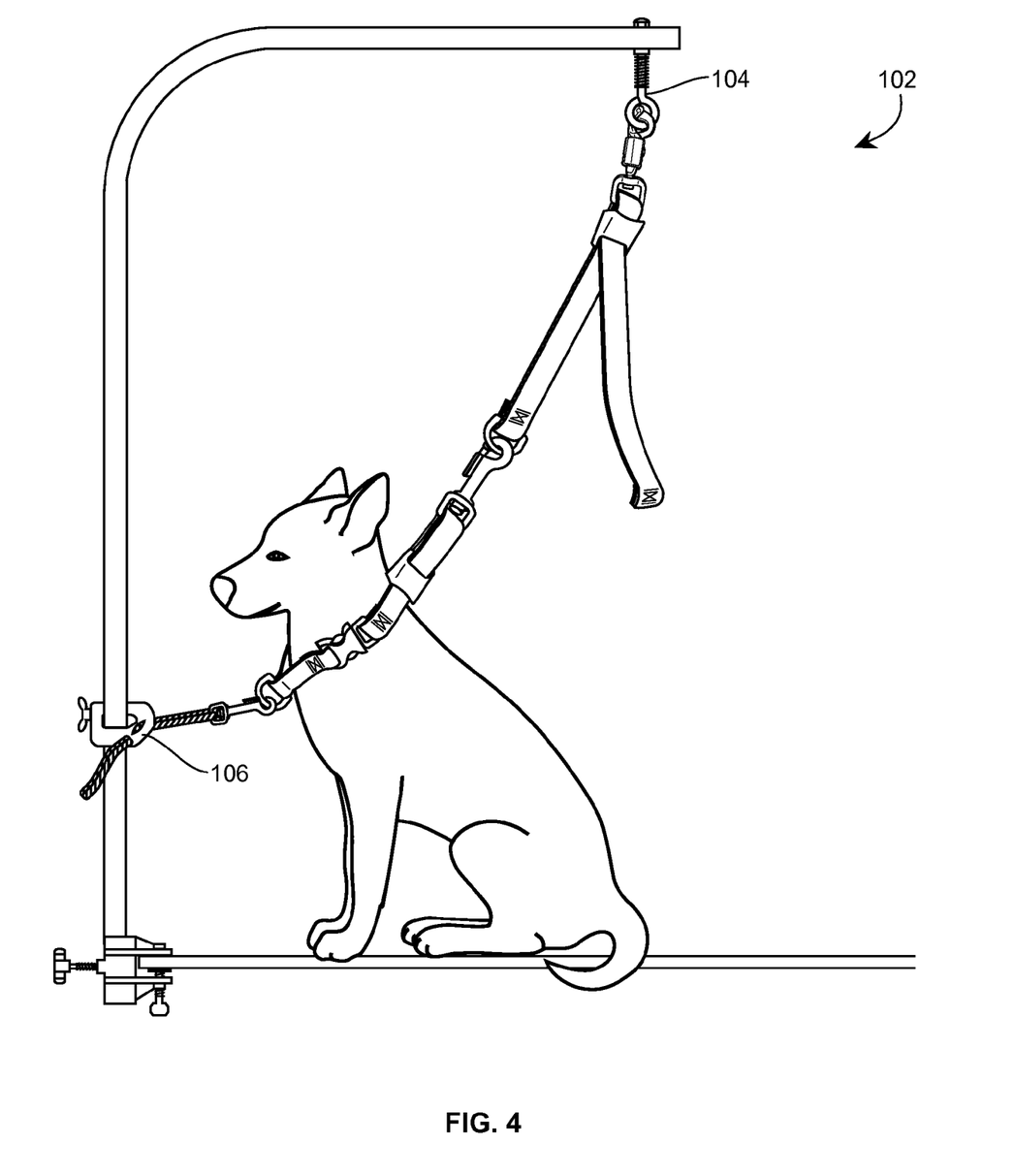
FIG. 4 illustrates a perspective view of another system for handling animals.

Referring now to FIG. 4, a system 102 for restraining an animal includes the restraint of FIG. 3 with an animal's neck disposed in the primary loop 76. The system 102 is similar to the systems described above except the fourth connector 94 of the folded strap 80 is releasably connected to a first anchor point 104 and the second connector 72 of the looped strap is releasably connected to the second anchor point 106.

The restraint may further include a quick-release connector 108 disposed in line with one of the first or second opposing sides of the primary loop and adapted to open the primary loop. The quick-release connector 108 may be more proximate to one of the first and second connection loops than to the other of the first and second connection loops. With the quick-release connector and the first clamp, the restraint contains two mechanisms to engage and release the primary loop. The quick-release connector can be opened quickly to easily release and free the animal from the restraint, particularly in an emergency, without having to take the primary loop over the head of the animal. Moreover, the quick release connector permits the handler's hands to be behind the animal's neck when engaging or releasing the primary loop to or from the animal, instead of a hand being in front of the animal's mouth, as would be the case with a loop that does not contain a quick-release connector, thus making the handler safer from being bitten by the animal when putting the restraint on or taking it off.

The method for using any of the restraints or restraint systems described above includes providing the restraint or restraint system; placing the neck of an animal's head in the primary loop; adjusting the size of the primary loop and/or the position of the first clamp in relation to the strap to comfortably fit the primary loop around the animal's neck; clamping the first clamp to fix the size of the primary loop; adjusting the size of the third loop and/or the position of the second clamp in relation to the strap to obtain the appropriate length of the strap between the primary loop and the first anchor point.

The primary loop may be adjusted to fit the circumference of an animal's neck by putting the clamp in the open position and adjusting the length of the strap between the first clamp and the second connector. Once the desired size of the loop is obtained, the clamp can be closed, thereby locking the size of the primary loop in place. Similarly, once the animal has been restrained in the primary loop, the handler may place the second clamp in the open position and adjust the size of the third loop to fix the length of the strap between the primary loop and the first anchor point.

The location of the first and or second anchor points may also be adjusted and the anchor points fixed in place. For example, the first anchor point may be adjusted by adjusting the securing arm.

When the restrain includes a second or third folded strap connected the second connector and the second anchor point, the size of the loop and/or the position of the third clamp may be adjusted so as to maintain the distance between the second connector and the second anchor point.

The restraints, systems, and methods described herein allow the handler to control the animal without having to use both hands or require the need of an assistant and that allows the handler to quickly and efficiently adjust the system to any size animal, particularly, for example, the circumference of the animals neck and/or the height of the animal. The animal has only a small area in which it can move while at the same not being encumbered with uncomfortable pressure upon its throat. Further, with use of the loop and system, the handler can safely work on all parts of an animal's anatomy without substantial danger of being bitten or losing control over an animal.

Although the present invention has been described with reference to the embodiments set forth, those skilled in the art will recognize that changes may be made in form and detail without departing from the spirit and scope of the invention. For instance, the loop may be used by animal groomers or veterinarians for a variety of animals, including, but not limited to, dogs, cats, rabbits or other small animals. Likewise, the grooming loop can be used by many professionals and aides who handle domestic and outdoor animals and have need to control their movements, while still giving them considerable freedom of movement. Professionals and aides include, but are not limited to, groomer's aides, veterinarian technicians, animal shelter personnel, kennel personnel, zoo personnel, animal control officials, game wardens or other animal handlers.

What is claimed is:

1. A restraint for an animal, the restraint comprising:
   a strap forming first and second connection loops and including a first strap portion and a second strap portion connected between the connection loops to form a restraining loop, wherein the first and second strap portions have substantially equal lengths;
   a first connector affixed at the first connection loop;
   a second connector affixed at the second connection loop;
   a quick-release connector disposed in line with one of the first or second strap portions and adapted to open the restraining loop, the quick-release connector being more proximate to one of the first and second connection loops than to the other of the first and second connection loops; and
   a clamp slidably disposed over the first and second strap portions, wherein the clamp is adapted to divide the restraining loop into a primary loop and a secondary loop and to maintain a size of the primary loop around the animal's neck, and the quick-release connector is positioned to open the primary loop.

2. The restraint of claim 1, wherein at least one of the first connector and the second connector comprises a snap closure mechanism.

3. The restraint of claim 1, wherein the second connector comprises one of a D-ring and a grommet.

4. The restraint of claim 1, wherein the clamp comprises a cam-snap.

5. The restraint of claim 1, wherein at least one of the first connection loop and the second connection loop is formed by an end of the strap folded back upon and secured to itself by a clamping mechanism.

6. An animal restraint system comprising:
   a first securing arm;
   a second securing arm; and
   a restraint comprising:
      a strap forming first and second connection loops and including a first strap portion and a second strap portion connected between the connection loops to form a restraining loop, wherein the first and second strap portions have substantially equal lengths;
      a first connector affixed at the first connection loop and coupled to the first securing arm, wherein the first securing arm is configured to couple to the first connector above an animal's head;
      a second connector affixed at the second connection loop and coupled to the second securing arm, wherein the second securing arm is configured to couple to the second connector at or below the animal's head;
      a quick-release connector disposed in line with one of the first or second strap portions and adapted to open the restraining loop, the quick-release connector being more proximate to one of the first and second connection loops than to the other of the first and second connection loops; and
      a clamp slidably disposed over the first and second strap portions, wherein the clamp divides the loop into a primary loop and a secondary loop and is configured to maintain a size of the primary loop when placed around the animal's neck, and the quick-release connector is positioned to open the primary loop.

7. The restraint of claim 6, wherein at least one of the first connector and the second connector comprises a snap closure mechanism.

8. The restraint of claim 6, wherein the second connector comprises one of a D-ring and a grommet.

9. The restraint of claim 6, wherein the clamp comprises a cam-snap.

10. The restraint of claim 6, wherein the clamp is configured to adjust and maintain the size of the primary loop around the animal's neck while the primary loop is around the animal's neck.

11. The restraint of claim 6, wherein the first and second securing arms are integrated in an L-shaped configuration.

12. The restraint of claim 6, wherein at least one of the first connection loop and the second connection loop is formed by an end of the strap folded back upon and secured to itself by a clamping mechanism.

13. A method of restraining an animal, the method comprising:
   placing the animal adjacent each of a first securing arm and a second securing arm;
   placing a restraint around the animal's neck, the restraint comprising:
      a strap forming first and second connection loops and including a first strap portion and a second strap portion connected between the connection loops to form a restraining loop, wherein the first and second strap portions have substantially equal lengths;
      a first connector affixed at the first connection loop;
      a second connector affixed at the second connection loop;
      a quick-release connector disposed in line with one of the first or second strap portions and adapted to open the restraining loop, the quick-release connector being more proximate to one of the first and second connection loops than to the other of the first and second connection loops; and
      a clamp slidably disposed over the first and second strap portions, wherein the clamp divides the restraining loop into a primary loop and a secondary loop and is configured to maintain a size of the primary loop, which is placed around the animal's neck, and the quick-release connector is positioned to open the primary loop;

coupling the first connector to the first securing arm above the animal's head; and coupling the second connector to the second securing arm at or below the animal's head, wherein the second connector pulls the primary loop away from the animal's throat.

14. The restraint of claim 13, wherein at least one of the first connector and the second connector comprises a snap closure mechanism.

15. The restraint of claim 13, wherein the second connector comprises one of a D-ring and a grommet.

16. The restraint of claim 13, wherein placing the restraint around the animal's neck includes:

placing the primary loop around the animal's neck; and slidably adjusting the clamp to reduce the size of the primary loop.

17. The restraint of claim 13, wherein the clamp comprises a cam-snap.

18. The restraint of claim 13, wherein the first and second securing arms are integrated in an L-shaped configuration.

19. The restraint of claim 13, wherein at least one of the first connection loop and the second connection loop is formed by an end of the strap folded back upon and secured to itself by a clamping mechanism.

\* \* \* \* \*